US007162540B2

(12) United States Patent
Jasen et al.

(10) Patent No.: US 7,162,540 B2
(45) Date of Patent: Jan. 9, 2007

(54) METHOD AND SYSTEM FOR PRIORITIZING NETWORK SERVICES

(75) Inventors: Mark Jasen, North Potomac, MD (US); Guy Daley, Reston, VA (US)

(73) Assignee: Catchfire Systems, Inc., Reston, VA (US)

( * ) Notice: Subject to any disclaimer, the term of this patent is extended or adjusted under 35 U.S.C. 154(b) by 1010 days.

(21) Appl. No.: 09/855,021

(22) Filed: May 15, 2001

(65) Prior Publication Data

US 2002/0019879 A1 Feb. 14, 2002

Related U.S. Application Data

(60) Provisional application No. 60/204,240, filed on May 15, 2000.

(51) Int. Cl.
G06F 15/16 (2006.01)
(52) U.S. Cl. ..................................................... 709/242
(58) Field of Classification Search ................ 709/242, 709/226, 220; 370/235, 395.4, 254, 236, 370/395.21, 232
See application file for complete search history.

(56) References Cited

U.S. PATENT DOCUMENTS

| 5,461,611 | A  | * | 10/1995 | Drake et al. ................. 370/420 |
| 6,014,384 | A  | * | 1/2000  | Weberhofer ............ 370/395.43 |
| 6,147,970 | A  | * | 11/2000 | Troxel ......................... 370/235 |
| 6,167,028 | A  | * | 12/2000 | Harris ......................... 370/230 |
| 6,188,671 | B1 | * | 2/2001  | Chase et al. ................. 370/232 |
| 6,198,723 | B1 | * | 3/2001  | Parruck et al. ........... 370/230.1 |
| 6,252,857 | B1 | * | 6/2001  | Fendick et al. ............. 370/254 |
| 6,400,954 | B1 | * | 6/2002  | Khan et al. .................. 455/450 |
| 6,445,679 | B1 | * | 9/2002  | Taniguchi et al. ........... 370/232 |
| 6,449,251 | B1 | * | 9/2002  | Awadallah et al. ......... 370/229 |
| 6,449,647 | B1 | * | 9/2002  | Colby et al. ................ 709/226 |
| 6,477,562 | B1 | * | 11/2002 | Nemirovsky et al. ....... 718/108 |
| 6,546,017 | B1 | * | 4/2003  | Khaunte ..................... 370/412 |
| 6,577,628 | B1 | * | 6/2003  | Hejza ......................... 370/392 |
| 6,594,234 | B1 | * | 7/2003  | Chard et al. ................ 370/236 |
| 6,633,569 | B1 | * | 10/2003 | Hemmady .................. 370/398 |
| 6,658,000 | B1 | * | 12/2003 | Raciborski et al. ......... 370/386 |
| 6,678,248 | B1 | * | 1/2004  | Haddock et al. ........... 370/235 |
| 6,718,326 | B1 | * | 4/2004  | Uga et al. ...................... 707/6 |
| 6,721,325 | B1 | * | 4/2004  | Duckering et al. ...... 370/395.4 |
| 6,775,280 | B1 | * | 8/2004  | Ma et al. .................... 370/392 |
| 6,781,996 | B1 | * | 8/2004  | Hemmady ............. 370/395.21 |
| 6,798,743 | B1 | * | 9/2004  | Ma et al. .................... 370/235 |

\* cited by examiner

*Primary Examiner*—Andrew Caldwell
*Assistant Examiner*—Stephan Willett
(74) *Attorney, Agent, or Firm*—Pillsbury Winthrop Shaw Pittman LLP

(57) ABSTRACT

A method, system and computer program product of prioritizing network services is provided. Such prioritization may comprise a better level of service, more timely system response and/or preferential treatment of traffic. In an embodiment, prioritization is controlled by defining modes and levels of prioritization typically based on criteria, such as the value of a transaction, the standing of a user, or the type of transaction. Prioritization can also be established, for example, for a preset length of time or for one or more given transactions. The modes of prioritization may comprise remapping TCP ports to which a communication is directed, remapping (including redirecting) uniform resource locators (URLs) and/or Internet Protocol (IP) addresses to which a communication is directed and/or tagging communications with quality of service (QoS) information. The levels of prioritization define the type(s) of priority service offered to a user, such as timeliness of system response and preference of traffic treatment, and may be arbitrarily defined.

61 Claims, 9 Drawing Sheets

METHOD AND SYSTEM FOR PRIORITIZING NETWORK SERVICES

This application claims the benefit of U.S. Provisional Application Ser. No. 60/204,240, filed May 15, 2000 and the contents of that U.S. Provisional Application are incorporated herein by reference.

BACKGROUND

1. Field of the Invention

This invention relates in general to the field of network services. Particularly, aspects of this invention pertain to prioritizing network services.

2. General Background and Related Art

As in the concept of providing priority mail, certain network users would prefer or need to have their network traffic get to that network user immediately or ahead of other traffic. With the fast pace of some of today's business activities such as the stock market, it is imperative for some transactions to be conducted essentially immediately such as for example a stock buy or sell order. In such a fast paced environment, a delay may result in dire losses to the buyer or seller. These types of transactions completed over the network need priority of communication. Further, such transactions have to be reliable and accurate, and should be private and secure.

Current technologies have not been able to solve the problem of prioritizing network traffic. For example, many current technologies suffer from not being able to provide the means for instantly recognizing (and/or rewarding) network users with priority of communication. Further, many current technologies do not provide a solution to prioritize data traffic based on the needs of the network services provider or that integrates (rather than replaces) existing applications and/or infrastructure of the network services provider or the network user.

Accordingly, there is a need in the art for an improved solution to providing network services comprising priority of communications. Therefore, it is advantageous to provide a method and system for prioritizing network services.

BRIEF DESCRIPTION OF THE DRAWINGS

The embodiments of the present invention are illustrated by way of example and not limitation in the figures of the accompanying drawings in which like references indicate similar or corresponding elements and in which.

DETAILED DESCRIPTION

According to an embodiment of the present invention, there is provided a method, system and computer program product of prioritizing network services. Such prioritization may comprise a better level of service, more timely system response and/or preferential treatment of traffic, In an embodiment, prioritization is controlled by defining modes and levels of prioritization typically based on criteria, such as the value of a transaction, the standing of a user, or the type of transaction. Prioritization can also be established, for example, for a preset length of time or for one or more given transactions. The modes of prioritization may comprise remapping TCP ports to which a communication is directed, remapping (including redirecting) uniform resource locators (URLs) and/or Internet Protocol (IP) addresses to which a communication is directed and/or tagging communications with quality of service (QoS) protocol information. The levels of prioritization define the type(s) of priority service offered to a user, such as timeliness of system response and preference of traffic treatment, and may be arbitrarily defined.

Thus, through the use of prioritization, a network services provider can provide and control the network services to users of its services. For example, a user can be "first" in sending and receiving data or messages depending on the level of prioritization associated with a user (e.g. a preferred user versus a casual user), with the network traffic from the user (e.g. a revenue-generating transaction versus an inquiry transaction) or with any other criteria. As used herein, a network services provider can be any type of provider of electronic services using data and message communication. In an embodiment, the network services provider is an Internet services provider of electronic services using data and message communication over the Internet. Example Internet services providers according to the description herein are operators of commercial Web sites offering services and/or products through the Internet such as an online stock brokerages or electronics retailer, providers of Internet connectivity to consumers, etc.

Figure 1:
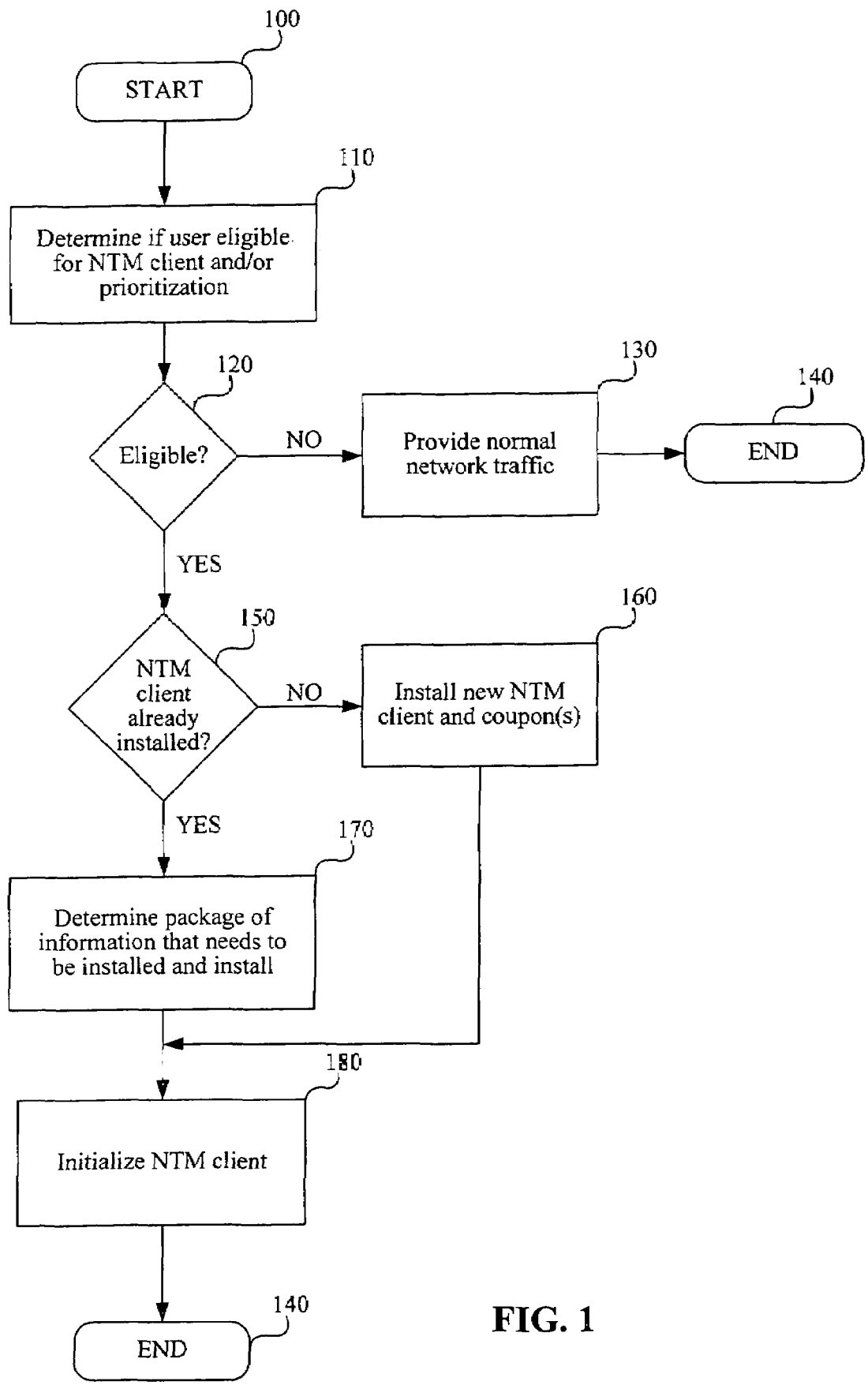
FIG. 1 is a flow chart of the installation of a new or updated network traffic management (NTM) client and/or coupon(s) of a client-server NTM system according to an embodiment of the invention.

In an embodiment of the invention, a network traffic management (NTM) system comprising a set of client and server functionality is provided. Referring to FIG. 1, a network service provider that employs the NTM system (hereafter NTM provider) determines, based on, for example, a user's log-in information, whether the user of the NTM provider's network services is eligible for a NTM client and/or NTM prioritization 110. In a typical scenario, the user accesses a URL or IP address of the NTM provider through a Web browser, which access triggers the prioritization eligibility determination in the NTM server. While an embodiment of the invention is described herein with reference to a Web commerce application, it should be apparent to those skilled in the art that the invention may be used for other applications including non-Web or non-commerce related applications.

If a user is not eligible 120, the NTM system allows for the provision of normal network services 130 to the user i.e. services without prioritization provided by the NTM system. Optionally, the NTM system may offer the user the ability to become eligible for prioritized network services through the NTM system.

If the user is eligible 120 but does not have NTM client software (as described in more detail hereafter) installed 150, a NTM client is installed to the user's device 160. For example, the NTM server may install the NTM client on the user device via a number of different methods including silent, semi-silent or verbose type install as described in more detail hereafter. One or more electronic upgrade coupons (hereafter coupon(s)) would also be installed to the user's device, for example, by the NTM server using any of the install methods described above. As described hereafter in more detail, the coupon(s) is used in conjunction with the NTM system to facilitate the prioritization of the provision of network services to the user.

If a NTM client is already installed 150 on the user's device (whether previously delivered by the NTM provider with which the user is communicating or otherwise, e.g. a NTM client delivered by another NTM provider), the NTM system determines what package of information, e.g. either the full NTM client including one or more new coupons, an update to the existing NTM client, one or more new coupons or an update to one or more coupons already on the user's device, needs to be installed 170 to the user's device. For example, if a user already having a NTM client accesses a different NTM provider, only one or more new coupons may need to be installed on the user device by the NTM server using any of the install methods described above.

Once the NTM client is installed, initialized and operating (including loading and evaluating of the coupon(s)) 180, the user's network traffic or information about that traffic is routed through the NTM client to determine if the traffic should be provided prioritization or otherwise handled as normal network traffic. In a typical scenario, a Web browser is instructed by the NTM client to send URLs and/or IP addresses accessed in each open browser window (e.g. a user activating a hypertext transfer protocol (HTTP) link associated with a URL or IP address in a browser or entering an actual URL or IP address into a browser command line) to the NTM client to determine whether network traffic back to the sites associated with the URL or IP address should receive prioritization.

Figure 2A:
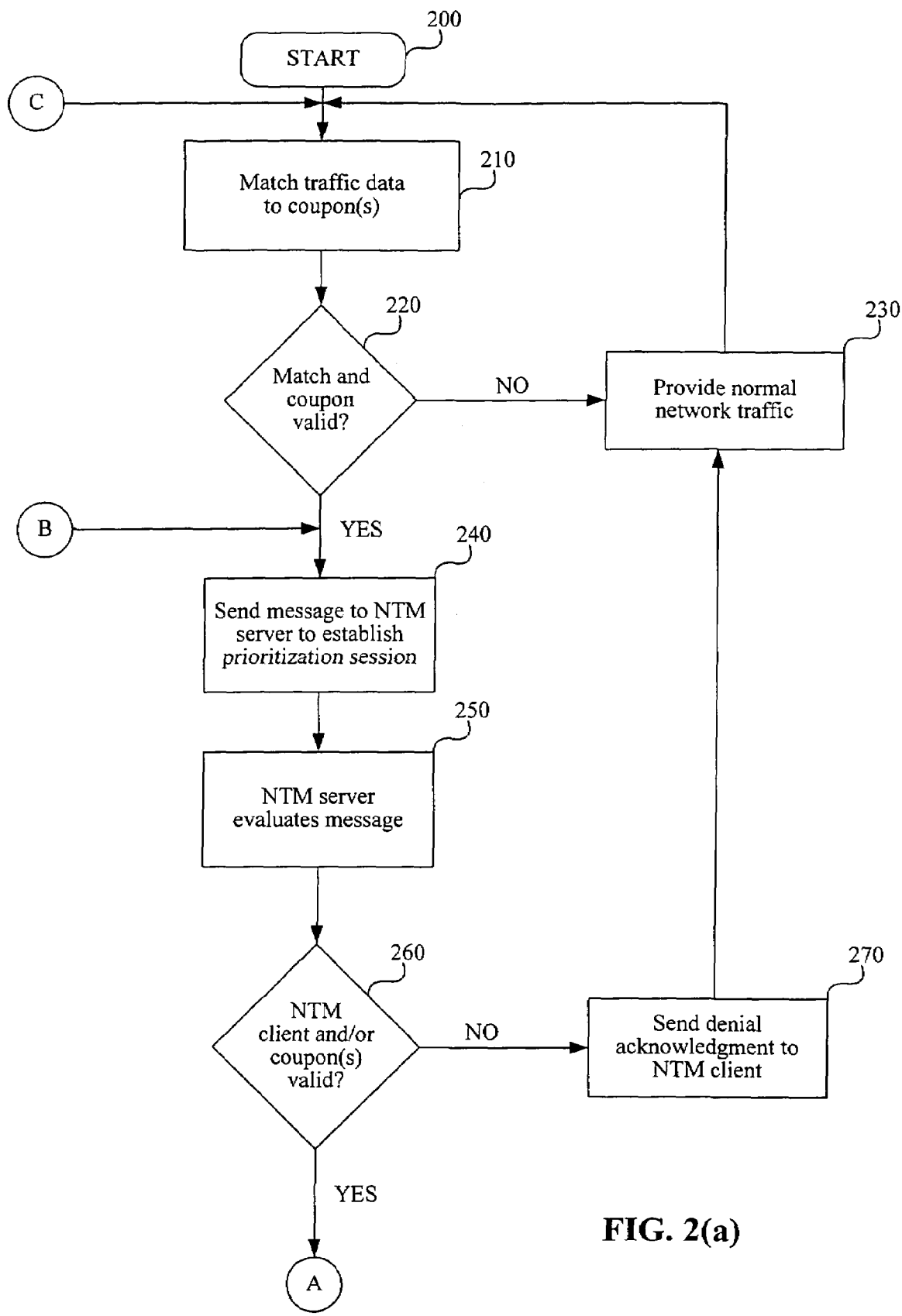
FIGS. 2(*a*) to (*c*) is a flow chart of the prioritization of a client-server NTM system according to an embodiment of the invention.
Figure 2B:
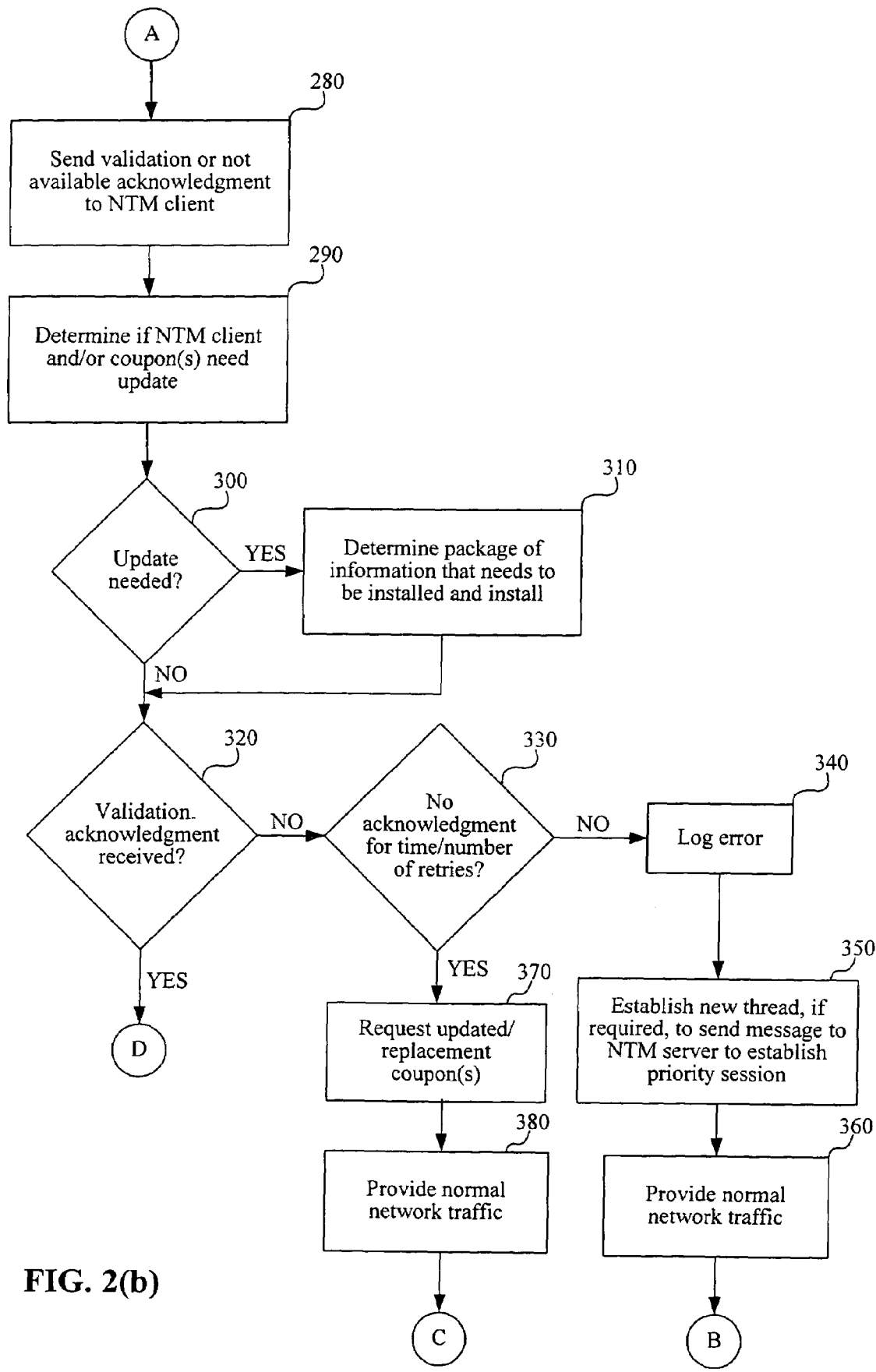
Figure 2C:
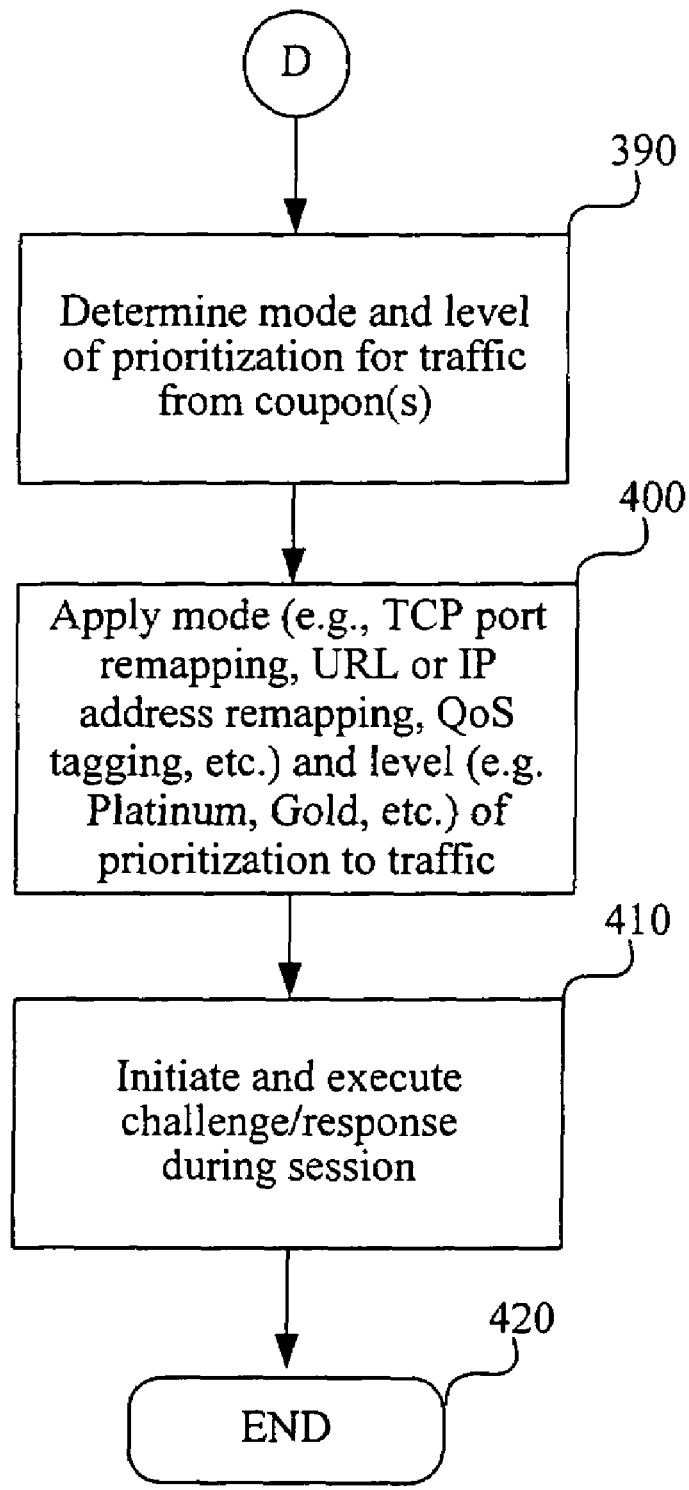

Referring to FIGS. 2(*a*)–(*c*), the NTM client matches 210 data associated with the network traffic to coupon data in one or more coupons to determine whether a user's network traffic may receive NTM prioritization. For example, the NTM client evaluates a URL or IP address associated with the network traffic against coupon data found in a URL or IP address field in one or more coupons on the user's device. If no match is found 220, the NTM client continues to match data associated with the network traffic to coupon data in one or more coupons but the network traffic continues to be handled as normal network traffic 230 without NTM prioritization. In the example of URL or IP address matching, the NTM client may only match if the URL or IP address changes (including any change or only certain changes e.g. an IP address outside of a defined range of IP addresses).

If a match is found and the coupon(s) is valid 220 because, for example, the coupon(s) is not expired, the NTM client sends a message 240 comprising information about the NTM client and/or coupon(s) to a NTM server (typically located at the origination of the matched traffic) announcing that a NTM prioritization session of network traffic is about to begin and to validate the NTM client and/or coupon(s). A match indicates NTM prioritization may be offered in association with the matched network traffic. More specifically, a match typically indicates that the matched network traffic originated from or passed through a NTM provider and that returning traffic may receive NTM prioritization by the NTM provider. If the NTM server receives the NTM client message to establish a prioritization session, the NTM server then evaluates the message 250. If the NTM client and/or coupon(s) are evaluated as invalid 260 because, for example, the coupon(s) have been revoked or the NTM client is unlicensed, a denial acknowledgment denying NTM prioritization is returned 270 to the NTM client and the sending and receiving of network traffic by a user proceeds without NTM prioritization 230. Optionally, an invalid coupon or NTM client may be deleted and/or one or more warning messages may be Rent to the user and/or a NTM server administrator advising of the denial.

If the NTM client and/or coupon(s) are valid and a prioritization session can he started 260, the NTM server sends back a validation acknowledgement 280 to the NTM client and the NTM server may also make a determination whether the NTM client and/or coupon(s) require updating 290 (e.g. in the situation where the NTM client is already operating but not recently initialized as described above). If updating is required 300, the NTM server may determine what package of information, e.g. either the full NTM client including one or more new coupons, an update to the existing NTM client, one or more new coupons or an update to one or more coupons already on the user's device, needs to be installed to the user's device and then perhaps facilitate installation of the information 310. For example, if an update is required, the NTM server may install the necessary package of information onto the user device. Such updating may occur at each new session such as when the traffic matches a new URL or IP address in the coupon data.

If the validation acknowledgment is received by the NTM client 320, the NTM client also processes other coupon data in the existing, new or updated coupon(s) to determine the mode and level of prioritization offered during the session 390 (although such determination could be done in the absence of the Validation acknowledgment is received). In an embodiment of the invention, the mode and level, if any, of prioritization is defined in the existing, new or updated coupon(s) based on an arbitrary criteria as selected by the NTM provider (such as customer value, content value, transaction value, or a temporal value or any combination thereof). The modes of prioritization may comprise remapping TCP ports to which a communication is directed, remapping (including redirecting) uniform resource locators (URLs) and/or Internet Protocol (IP) addresses to which a communication is directed and/or tagging communications with quality of service (QoS) information. The levels of prioritization define the type(s) of priority service offered to a user, such as timeliness of system response and preference of traffic treatment, and may be arbitrarily defined.

A first mode of prioritization involves remapping of the TCP port(s) to which traffic is directed to another TCP port(s). For example, traffic directed to standard HTTP ports 80 or 8080 may be remapped to an alternative defined port(s), whether defined by the NTM provider or defined by the NTM provider's applications or other system characteristics. A NTM provider can define any desired port(s) for remapping purposes subject only perhaps to a port(s) being unavailable or already reserved by dictate, practice or other purpose. In this manner, network traffic to the NTM provider can be sub-classed by which port the traffic comes in on and the NTM can thereby provide, if desired, differing levels of prioritization to the traffic. For example, NTM provider A could use port 9190 for Gold prioritization level traffic, 9290 for Silver prioritization level traffic and 9390 for Bronze prioritization level traffic. Similarly, NTM provider B could specify port 7652 for Gold prioritization level traffic, 7552 for Silver prioritization level traffic, and 7452 for Bronze prioritization level traffic. In this way, each NTM provider would be able to define to which ports to send which quality of service traffic. Indeed, a NTM provider may decide to use this type of traffic segregation for applications other than providing differing levels of network services such as providing better information to content-distribution systems without the use of cookies.

Another mode of prioritization involves remapping (including redirecting) traffic directed to a URL or IP address to an alternative URL or IP address. For example, traffic addressed to a NTM provider's example IP address 11.22.33.44 may be remapped to NTM provider's other example IP address 11.22.33.45 or to any other IP address whether of the NTM provider or not. A NTM provider can define any desired alternative URL(s) or IP address(es) for remapping purposes subject only perhaps to the URL(s) or IP address(es) being unavailable or already reserved by dictate, practice or other purpose. In this manner, just as with TCP port remapping, network traffic to the NTM provider can be sub-classed by which URL or IP address the traffic comes in on and the NTM can thereby provide, if desired, differing levels of prioritization to the traffic. For example, a NTM provider could use the example IP address 11.22.33.45 for Gold prioritization level traffic, 11.22.33.46 for Silver prioritization level traffic and 11.22.33.47 for Bronze prioritization level traffic. In this way, a NTM provider would be able to define to which URLs or IP addresses to send which quality of service traffic. This URL or IP address remapping is useful, for example, if a NTM provider has a separate infrastructure for certain traffic and access to the infrastructure is through the remapped URL or IP address. By remapping the URL or IP address of the traffic, the user may be able to receive the traffic faster, can bypass domain name service (DNS) lookups and avoid using certain of the NTM provider's resources, perhaps unnecessarily. Also, like with TCP ports, a NTM provider may decide to use this type of traffic segregation for applications other than providing differing levels of network services.

A last mode of prioritization involves tagging network traffic messages or packets with QoS information. For example, if QoS features, such as RSVP (a reservation protocol used by a host to request a specific quality of service for particular application data streams or flows as outlined in IETF RFC 2205 and subsequent/ancillary RFCs), DiffServ (differentiated services enhancements to IP headers outlined by IETF RFC 2474 and subsequent/ancillary RFCs), MPLS (multiprotocol label switching which comprises assigning short fixed length labels to packets entering into a MPLS system wherein the labels can be used to make packet forwarding decisions as outlined by IETF RFC 2702 and subsequent/ancillary RFCs) or other similar protocols are available in the NTM provider's infrastructure (or for that matter any other infrastructure on which the messages or packets may travel), each packet may be tagged with the appropriate QoS information in the TCP/IP header. When a QoS-tagged packet reaches infrastructure offering the relevant QoS, the packet could be handled according to that QoS if implemented by the infrastructure's protocols. In an embodiment, the QoS tagging may be used in combination with or in lieu of TCP port remapping or URL or IP address remapping.

Once the mode(s) and level(s), if any, of prioritization is determined, the NTM client applies 400 the mode of prioritization according to the levels of prioritization, if any, as determined above to the traffic returning to the NTM provider from the user/NTM client. Particularly, if the mode is remapping of TCP ports, the traffic for the session (or for a part of the session such a transaction) has its port(s) remapped as defined by the coupon data. Similarly, the URL(s) or IP address(es) may be remapped for the whole or part of a session and/or QoS information may be tagged into traffic messages or packets for the whole or part of a session. Once the mode(s) and level(s), if any, of prioritization are applied to the traffic, the prioritization-applied traffic is sent to the NTM provider. The provider's NTM server, if required, directs the traffic with applied prioritization as required to any application or other servers within the NTM provider infrastructure for the duration of the whole or part of the session. So, in the example of TCP port, URL or IP address remapping, the traffic coming in to the NTM provider on a remapped TCP port, URL or IP address may be directed to one or more designated NTM provider servers (whether NTM servers or other services) for handling the traffic. Or, in the example of QoS tagging, the NTM provider infrastructure may process the QoS information tagged into the traffic messages or packets and apply the Quality of service designated by the tagged QoS information.

Returning to the original message sent by the NTM client to establish a prioritization session, if no acknowledgement is received in a reasonable amount of time by the NTM client from the NTM server or the NTM client receives back acknowledgments indicating that NTM prioritization is not available 320, the traffic proceeds as normal network traffic without NTM prioritization 360, 380. In the case of acknowledgments indicating that NTM prioritization is not available, the NTM server may still determine and facilitate the installation of an updated NTM client and/or coupon(s). In a NTM client error and recovery mode, a separate communications thread is initiated by the NTM client to continue requesting a NTM prioritization session. Such retries may be at random times or may be defined by coupon data from one or more coupons associated with the NTM client. Any failed acknowledgments, whether from the original NTM client message sent to the NTM server or any subsequent retries, may be logged 340 by the NTM client as an error although the traffic will continue to be handled as normal network traffic 360 without NTM prioritization. If a retry to an acknowledgement indicating that NTM prioritization is not available results in a validation acknowledgment, a challenge and response as described in more detail hereafter may be initiated to update, if necessary, the coupon (s) and the prioritization session is established using any existing, new or updated coupon(s); for other validation acknowledgements, the prioritization session set-up described above is executed. If no acknowledgment is received over some definable period such as a lapse of time or number of retries 330, the NTM client may delete the coupon(s) associated with the NTM client and/or may autonomously communicate wilt the NTM server and request a replacement or updated coupon(s) 370.

Figure 3:
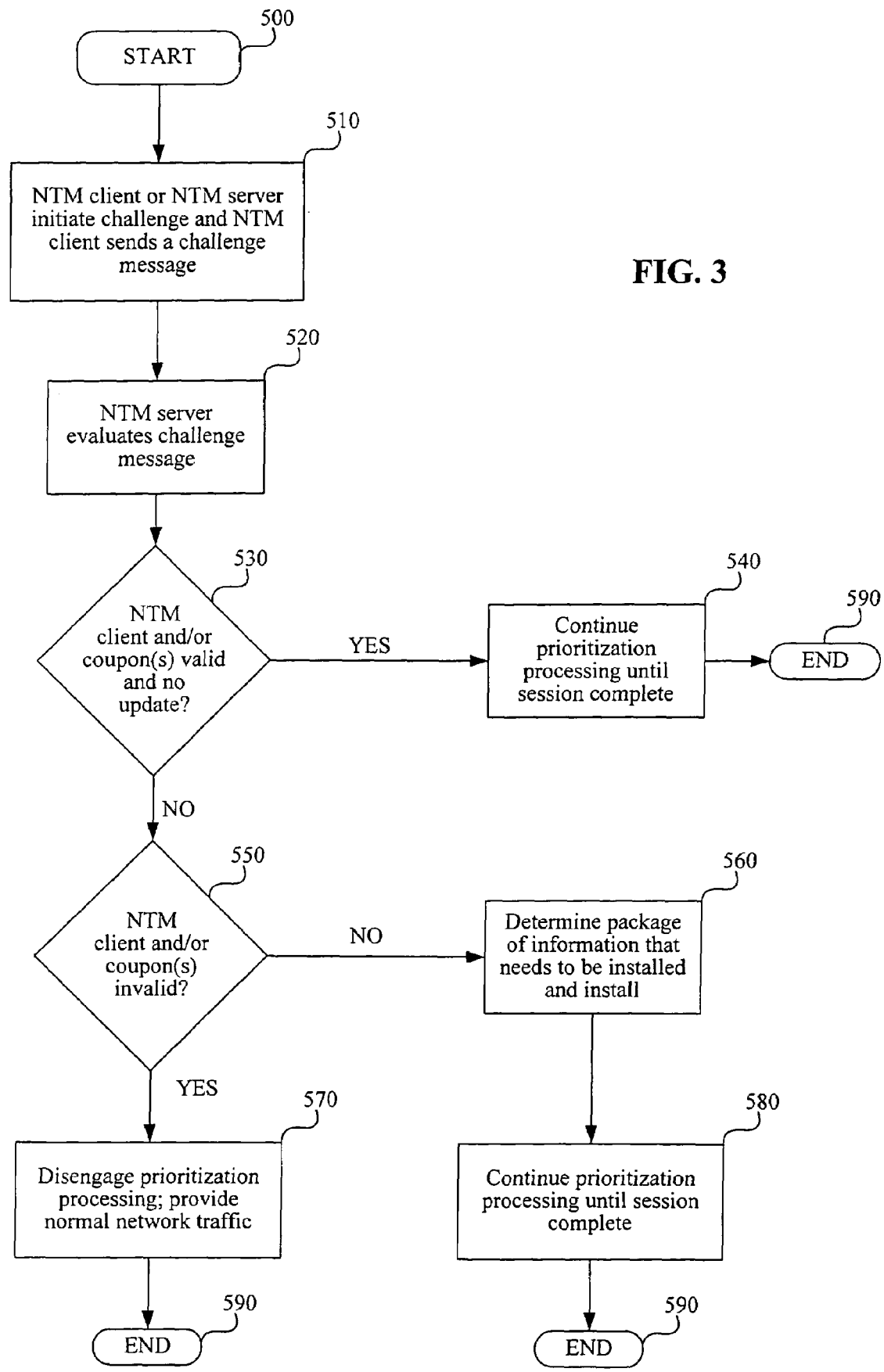
FIG. 3 is a flow chart of the challenge/response of a client-server NTM system according to an embodiment of the invention.

At intervals (which may be random, defined by coupon data or otherwise defined) during successsfully created NTM prioritization session, the NTM client and the NTM server may engage in a challenge and response 410 to verify the coupon(s) associated with the NTM client and for the NTM server to update, if necessary, the coupon(s) associated with the NTM client. Referring to FIG. 3, in an embodiment, a challenge/response message, comprising one or more coupon serial numbers, initiated by either the NTM client or the NTM server is issued during a session 510. For example, if the NTM server initiates the challenge/response, the NTM server requests the NTM client to respond with a message comprising the coupon serial number(s) of the coupon(s)

used in the session and the NTM client returns such a message. If the NTM client initiates the challenge/response, it does so by sending a message comprising the coupon serial number(s) of the coupon(s) used in the session.

The NTM server evaluates 520 the coupon serial number(s) and then responds with a validation message 540 if the coupon serial number(s) is valid and no update is required for the coupon(s) for use with that NTM provider 530. A validation message indicates that traffic prioritization processing should continue according to coupon data in the existing coupon(s) associates with the NTM client. Depending on how a NTM server is implemented, if the coupon serial number(s) is no longer valid or another invalid message arrives as a challenge/response 550, the NTM server may automatically update the coupon(s) on the NTM client so that tagging or remapping is disengaged or direct the NTM client to delete the coupon(s), in either case the traffic would be handled by the NTM client as ordinary network traffic without NTM prioritization 570. If the coupon serial number(s) is valid 550 and an update of the coupon(s) is necessary or available (e.g. a NTM administrator alters one or more coupons), the NTM server may determine the relevant coupon(s) required or available and facilitate the installation of the coupon(s) in association with the NTM client 580 and normal prioritization processing may continue 580. For example, the NTM server may send a new or updated coupon(s) to the NTM client, which may accept the new or updated coupon(s) for installation (and process traffic for NTM prioritization according to coupon data in the coupon(s)) or use the existing coupon(s). Optionally, each challenge and response may be logged by the NTM client and/or NTM server. Such verification is used, among other things, to prevent spoofing and to enhance security.

In another embodiment of the invention, a NTM system comprising server only functionality is provided. This embodiment offers an alternative to the client-server embodiment although it also may be used in conjunction with the client-server embodiment. This embodiment is useful for situations where, for example, the NTM provider does not have reasonable means to reliably remotely install the NTM client on a user's device, when the user is another server and the communications are perhaps automated and accomplished without the aid of a user, or the overhead of error checking and authentication of the NTM client negates the overall performance benefits available to the NTM provider by the NTM system.

Figure 4:
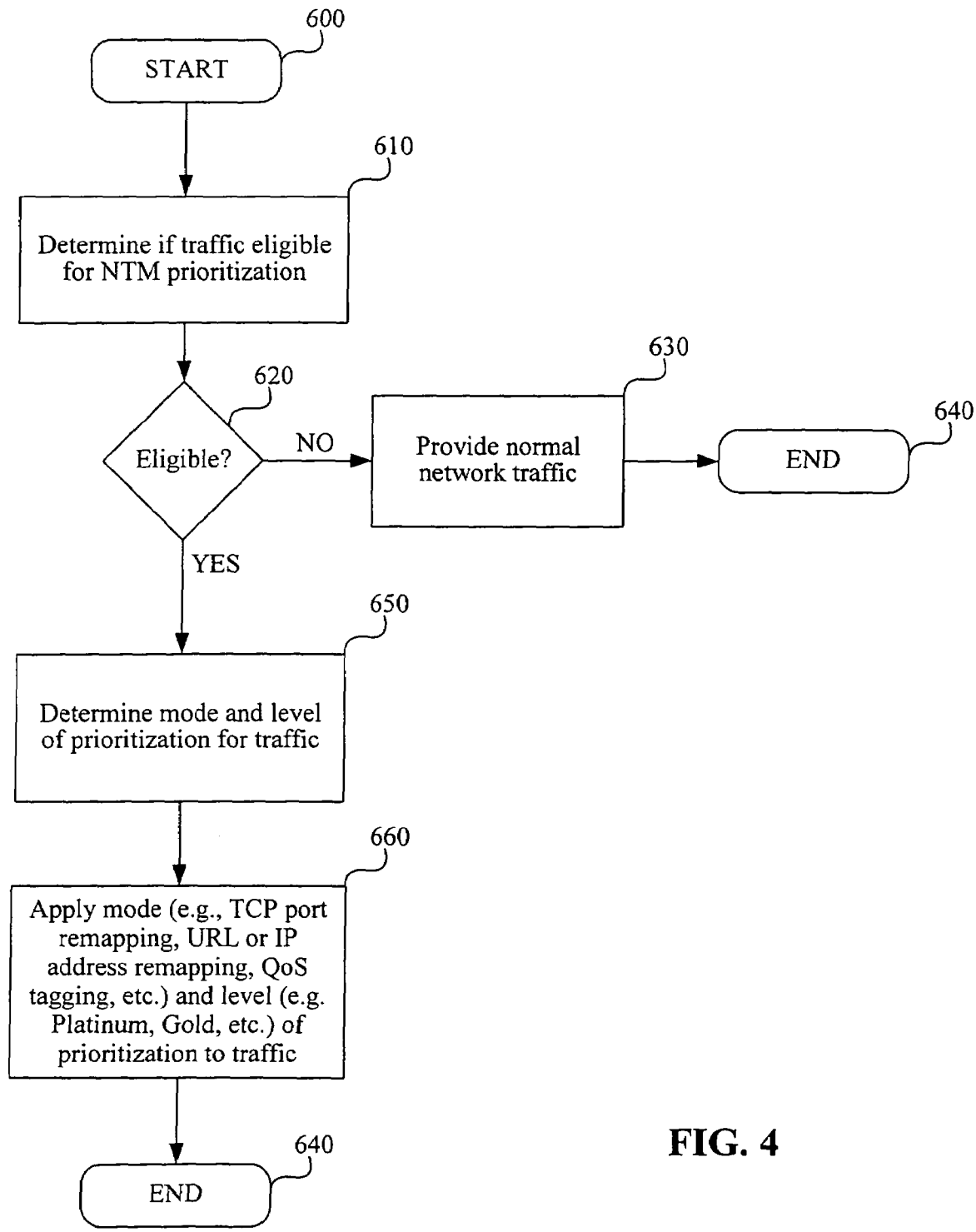
FIG. 4 is a flow chart of the prioritization of a server NTM system according to an embodiment of the invention.

In this embodiment, the NTM server acts in-stream to the network traffic to apply prioritization to that traffic or to otherwise handle that traffic as normal network traffic. Referring to FIG. 4, the NTM server determines based on, for example, a user's log-in information, a session ID from a NTM provider Web server or application server, or a particular service request (e.g. a buy request), whether the user of the NTM provider's network services is eligible for NTM prioritization 610. In a typical scenario, the user logs into the NTM provider's system through a Web browser, which access triggers the prioritization eligibility determination in the NTM server. Information for such eligibility determination, including mode(s) and level(s), if any, of prioritization, is configured in the NTM server (as described in more detail hereafter) or optionally may be provided in a coupon whether located on the accessing user's device or maintained elsewhere or through an API.

If a user is not eligible 620, the NTM system allows for the provision of normal network traffic 630 to the user i.e. services without prioritization provided by the NTM system. However, the NTM server may continue to determine whether traffic is eligible for prioritization. In the example of determining eligibility based on log-in information, the NTM server may make an eligibility determination even if the URL or IP address accessed changes (including any change or only certain changes e.g. an IP address outside of a defined range of IP addresses). Optionally, the NTM system may offer the user the ability to become eligible for prioritized network services through the NTM system.

If the user is eligible 620, the NTM server determines the mode and level of prioritization offered to the traffic 650. In an embodiment, the mode and level, if any, of prioritization is defined in the NTM server based on arbitrary criteria as selected by the NTM provider such as customer value, content value, transaction value, or a temporal value (such as time of day, day of week, time of year, etc.)—or a combination matrix of all four—as based on the subjective value placed on them by the NTM provider. The modes of prioritization may comprise, as discussed in more detail above, remapping TCP ports to which a communication is directed, remapping uniform resource locators (URLs) and/or Internet Protocol (IP) addresses to which a communication is directed and/or tagging communications with quality of service (QoS) information, The levels of prioritization define the type(s) of priority service offered to a user, such as timeliness of system response and preference of traffic treatment, and may be arbitrarily defined.

Once the mode(s) and level(s), if any, of prioritization is determined, the NTM server applies 660 the mode of prioritization according to the levels of prioritization, if any, as determined above to the traffic returning to the NTM provider from the user. Particularly, if the mode is remapping of TCP ports, the traffic has its port(s) remapped as defined by the NTM server (whether as configured in the NTM server or, for example, from one or more coupon(s) or through an API). Similarly, the URL(s) or IP address(es) associated with the traffic may be remapped by the NTM server and/or QoS information may be tagged by the NTM server into outgoing traffic, whether traffic back to the user or further within the NTM provider's infrastructure. Where QoS tagging is applied to traffic within the NTM infrastructure, the NTM provider infrastructure may process the QoS information tagged into the traffic and apply the quality of service designated by the tagged QoS information.

In an embodiment, the remapping is performed by sending a message back to the user's browser to redirect the URL or IP address and/or the TCP port to which the browser is pointing to a new URL or IP address and/or TCP port as defined by a level, if any, of prioritization. Once the mode(s) and level(s), if any, of prioritization are applied to the traffic in this fashion, the prioritization-applied traffic is sent to the NTM provider directly at the new URL or IP address and/or TCP port. In another embodiment, the remapping is performed by the NTM server directing, at the server level, the traffic with applied prioritization as required to any application or other servers within the NTM provider infrastructure. So, in the example of TCP port, URL or IP address remapping, the traffic coming in to the NTM provider is remapped to a new TCP port, URL or IP address, as the case may be, and directed by the NTM server to one or more designated NTM provider servers (whether NTM servers or servers for other services) for handling the traffic.

Once the mode(s) and level(s), if any, of prioritization are applied, the NTM server may continue to determine the eligibility for prioritization and manage the determination of any number of potential mode(s) and level(s), if any, of prioritization that may be applied to the network traffic. For example, prioritization may only be applied to a certain transaction so that the prioritization may be discontinued if the user is no longer engaging in or requesting that certain transaction. Consider a Bronze (or best-efforts) prioritization level user initiating a revenue-producing transaction that the NTM provider has defined to be entitled to Gold level prioritization. So, the user is upgraded to Gold level prioritization for the duration of that transaction. Once that transaction is complete, the NTM provider may choose to relegate the user back to Bronze or other prioritization level. Similarly, certain criteria may override the prioritization provided to a user. For example, a Gold prioritization level user may always be afforded the highest level of prioritization regardless of specific activity or transactional value or time of day. As should be apparent, any number of permutations of applying modes and levels of prioritization is possible depending on any number of criteria.

As will be apparent to those skilled in the art, both the client-server and server only embodiment may incorporated together. Further, the server only embodiment may employ or take the benefit of the coupon(s) of the client-server embodiment to determine, for example, the mode and/or level of prioritization to be applied to network traffic.

NTM Client

Figure 5:
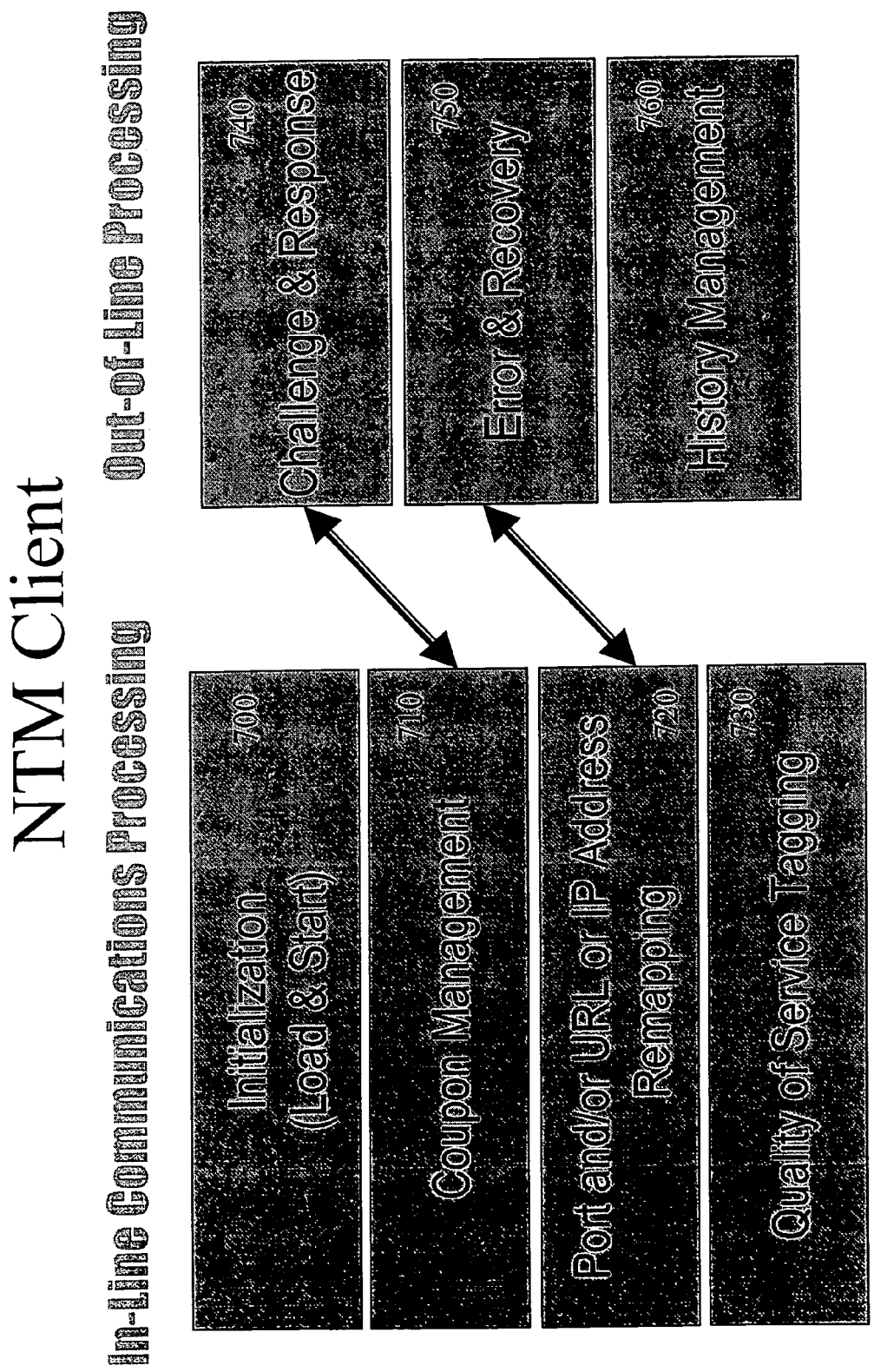
FIG. 5 is a NTM client block diagram showing the in-line and out-of-line communications processing of the NTM client according to a client-server embodiment of the invention.

FIG. 5 is a block diagram illustrating the basic architecture of a NTM client according to a client-server embodiment of the invention. Referring to FIG. 5, the in-line communications and out-of-line processing units of the NTM client are shown. The in-line communications processing units comprise an initialization unit 700, a coupon management unit 710, a port and/or URL or IP address remapping unit 720 and a quality of service tagging unit 730. The out-of-line processing units comprise a challenge and response unit 740, an error recovery unit 750 and a history management unit 760.

The in-line communication processing units implement aspects of the NTM client actively involved in traffic processing for NTM prioritization. The initialization unit of the NTM client manages the loading and starting of the NTM client. It initializes the NTM client (including, where implemented, facilitating the installation of the NTM client from a NTM server) and establishes its operation. The coupon management unit handles the coupon(s) associated with the NTM client. Its functions include, but are not limited to, installing new coupons, updating existing coupons, deleting coupons, reading and/or searching coupons, and retrieving coupon data. It also implements determining the mode(s) and level(s), if any, to be applied to the traffic. The port and/or URL or IP address remapping unit implements the remapping of the TCP port and/or URL or IP address for NTM prioritization. Details of such remapping are described in more detail herein. The quality of service tagging unit implements the QoS information tagging into traffic packages or messages for NTM prioritization. Details of such tagging are described in more detail herein.

The out-of-line processing units implement aspects of the NTM client incidental to the traffic processing for NTM prioritization. The challenge and response unit implements the challenge and response messaging to verify the coupon (s) associated with the NTM client and for the NTM server to update, if necessary, the coupon(s) associated with the NTM client as further described herein. The error and recovery unit implements the error logging and management of the NTM client, including the processing of session acknowledgements received from a NTM server, and also facilitates re-sending of messages as required. The history management unit implements recording usage of the NTM client and NTM prioritization in order to provide statistical data about the operation of the NTM system.

In an embodiment of the invention, the NTM client is a Web browser plug-in, an ActiveX control (for computers using the Microsoft Windows operating system), or a Java servlet, applet or application. As will be skilled to those in the art, the NTM client may also be integrated into a user's computer operating system or browser or be available as a stand-alone application on the client computer. The NTM client may implemented in any number of operating environments and platforms including, but not limited to, personal computers using variants of the Microsoft Windows operating system and running the Microsoft Internet Explorer browser, computers using any variety of the UNIX operating system running a Microsoft Internet Explorer browser, Internet-enabled Palm operating system or Microsoft WinCE operating system devices, mobile devices such as wireless web phones enabled to operate the Sun Microsystems, Inc. Java technology, and any successor or variant environments and platforms to the foregoing.

In an embodiment, the NTM provider can choose to make the NTM client and/or coupon(s) install in a silent (fully automatic), semi-silent, or verbose type fashion. In a silent install, the user is not notified of the installation of the NTM client and/or coupon(s) but rather the NTM client and/or coupon(s) is automatically installed. A quiet install provides some type of announcement message about the installation of the NTM client and/or coupon(s). In the quiet install, a level of disclosure of the installation is provided such as information as to the size of the installed code, its features, functions and benefits and can include a dialog box that allows for the launch of a Web browser window that brings the user to a Web site providing more information about the NTM client and/or coupon(s) and the installation process. The third type, or verbose install, is a full disclosure installation of the NTM client and/or coupon(s). It gives the user the right to reject the installation and provides full details on features, functions and benefits of the NTM client. It would also include some information about the coupon(s) and NTM prioritization that is being provided. In an embodiment, the NTM client and/or coupon(s) is installed by automatic download from the NTM server to the user device in any of the manners described above. As will be apparent to those skilled in the art, any number of different schemes may be used to install the NTM client and/or coupon(s) to the user device including simply allowing the user download the NTM client and/or coupon(s) and install manually.

The NTM client may also be installed in and executed from a hidden system and read-only (except to the NTM system) directory somewhere in the file system. Hiding the relevant files, among other things, helps prevent accidental deletion and/or interference of the NTM client. Further, the NTM client may work silently in the background and provide the user little or no notification of its existence or operation. There is no required user interface for the NTM client and the user has no control over or ability to modify the contents of the NTM client and/or coupon(s). The NTM provider typically determines the coupon(s) contents and can configure the NTM client.

In an embodiment, the NTM client is callable via a NTM application programming interface (API). The NTM API can be used to read information from the NTM client and/or coupon(s) associated with the NTM client and be used as a mechanism to update/write information to the NTM client and/or associated coupon(s), similar to a common GET- or SEND- instruction in HTTP. For example, the NTM client can be called to change the level of prioritization or disengage prioritization completely. Such a change can be made, for example, if the NTM client has been given the logic to check for field-level values, evaluate those values, and change tagging and/or remapping accordingly. A change may also be made if the NTM client is explicitly instructed via its API to raise or lower service levels dynamically and changes tagging and/or remapping accordingly or simply is instructed to disengage prioritization once a client session has been established.

In an embodiment, through the use of coupons that may be assigned to different NTM providers as discussed herein, a user's NTM client may be used with numerous different NTM providers. Accordingly, the NTM coupon management unit of the NTM client is able to manage many and different coupons perhaps from a few to hundreds of different NTM providers.

NTM Server

Figure 6:
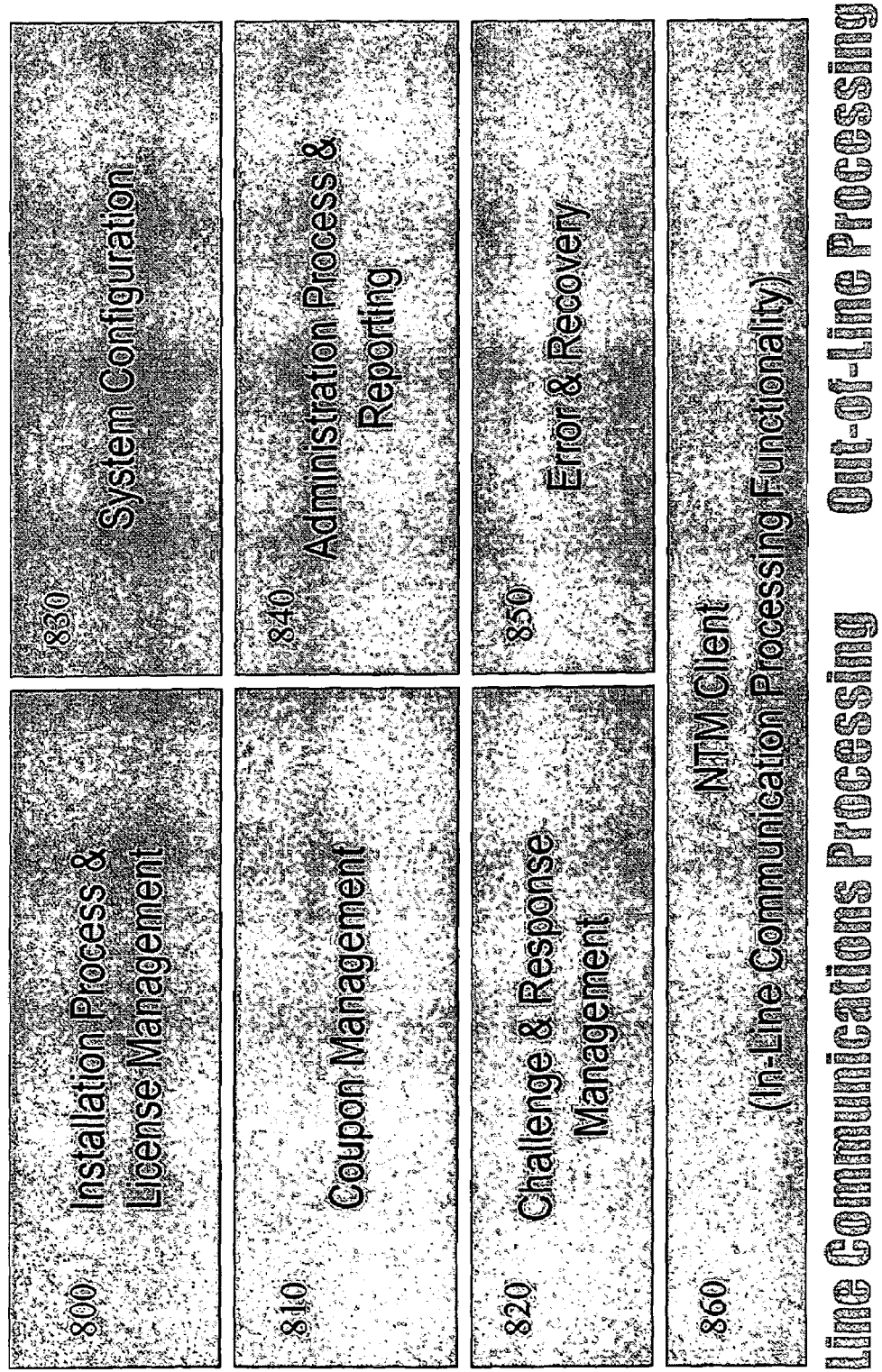
FIG. 6 is a NTM server block diagram showing the in-line and out-of-line communications of the NTM server according to a client-server embodiment of the invention.

FIG. 6 is a block diagram illustrating the basic architecture of a NTM server according to a client-server embodiment of the invention. Referring to FIG. 6, the in-line communications and out-of-line processing units of the NTM server are shown. The in-line processing units comprise an installation process and license management unit 800, a coupon management unit 810, and a challenge and response management unit 820. The out-of-line processing units comprise a system configuration unit 830, an administration process and reporting unit 840 and an error and recovery unit 850. The server also comprises a NTM client unit 860 for facilitating communication with the in-line communications processing functionality of the NTM client.

The in-line communication processing units implement aspects of the NTM server actively involved in traffic processing for and initialization of NTM prioritization. The installation process and license management unit of the NTM server manages the installation of a NTM client and/or coupon(s) to a user device. It determines the need for the installation of a new or updated NTM client (including, where implemented, collecting information about the user device configuration and facilitating the installation of the NTM client to the user device from a NTM server) and implements the licensing of the NTM client and/or coupon(s), if implemented. The challenge and response unit implements the challenge and response messaging to verify the coupon(s) associated with the NTM client and for the NTM server to update, if necessary, the coupon(s) associated with the NTM client as further described herein.

The coupon management unit handles the coupon(s) associated with the NTM server/provider. Its functions include, but are not limited to, determining the need to provide new, update or delete coupons from a user device and configuring, updating and/or creating coupons maintained in the NTM server. In active operation, the NTM server should be provided new coupons or updates to existing coupons managed by the NTM server by the provider's NTM server administrator or programmatically from another application such as a Web commerce application. In an embodiment, a coupon is created for each URL or IP address monitored for prioritization.

The coupon management unit populates standard coupon fields with data (see below for more discussion on coupon fields) using typically a coupon template and perhaps in conjunction one or more other database (such as customer/user database as discussed in more detail below). The coupon management unit also defines and determines the types of allowable coupon(s) in the NTM system. For example, a NTM system may offer and/or permit permanent, dissolving and/or third party or reference coupons. Permanent coupons have an undefined existence although they may be deleted/revoked. Dissolving coupons are of limited existence e.g. time limited or number of uses limited. Third party or reference coupons are coupons provided by parties other than the NTM provider but available for use in prioritization in the NTM system of the NTM provider. Accordingly in this case, the coupon management unit would identify, among other things, the how and number of permanent, dissolving and/or third party or reference coupons that would be created or used in the NTM system. An order of precedence may also be established between these types of coupons e.g. permanent coupons may take precedence over dissolving coupons at all times or the precedence can be resolved at use, and the "winning" coupon would provide the prioritization as defined in that coupon.

The coupon management unit may also provide a coupon template library manager. A coupon template is used to apply global, regional or local changes to field values in one or more coupons. For example, a default coupon template may define the default values of all standard coupon fields. Another coupon template may define the QoS values for a group of coupons. The coupon library manager facilitates managing coupon templates including creating (whether from scratch or based on one or more existing templates), adding, deleting and updating coupon templates. Optionally, the coupon management unit can be configured to ignore standard fields and employ field masking when managing the templates.

The out-of-line processing units implement aspects of the NTM server incidental to the traffic processing for NTM prioritization. The error and recovery unit implements the error logging and management of the NTM server and NTM client. Its data can be used to generate reports of NTM system performance as well as to modify operation of the NTM system, as required.

The system configuration unit of the NTM server is used to configure the operation of the NTM server. Typically, a NTM system administrator will securely sign on to the NTM server and configure the NTM system. For example, the QoS features available in the NTM provider infrastructure may be defined in the NTM system through the system configuration unit of the NTM server. Some of the QoS information that can be defined include the type of QoS protocol available (RSVP, DiffServ, MPLS, etc.), the QoS header string to be used for tagging, identification of whether a policy-based network management system is available and supported by the NTM server, and identification of a NTM system gateway in the local Internet service provider (ISP) or carrier network (and if so, the associated URL or IP address and QoS information).

The system configuration unit may also be used to define the prioritization of the NTM system. The one or more TCP ports, URLs and/or IP addresses, if any, used in the NTM provider infrastructure for the prioritization modes and the prioritization levels (e.g. Gold, Silver, Bronze, etc.), if any, associated therewith may be defined. For example, the top-level domain name(s), domain name mask(s), URL(s), URL mask(s), or IP address(es) of the NTM provider infrastructure may be defined for use with configuring the coupon(s) and for matching with the coupon(s), The default prioritization level for all incoming and/or outgoing NTM system traffic can also be defined. If the NTM provider infrastructure has been partitioned and NTM system traffic has been separately provisioned, the NTM server may automatically tag all outgoing traffic to a specific prioritization level. Also, the periodicity of the coupon challenge/ response may be defined as well as the whether the NTM server can issue only permanent, dissolving (see below for more details) or both types of coupons. Cookie information may also be mapped into coupon(s) by identifying the cookie(s), the cookie fields to be assimilated and mapping the cookie fields to coupon fields using translation as required.

The system configuration unit may also be used to define interoperation of the NTM server and NTM system with other hardware and software in the NTM provider's infrastructure. The number, kinds and location of servers in the NTM provider's infrastructure may be defined. The configuration of the NTM server with a transaction processing server (e.g. configure the NTM system to, if required, create special messages to enable priority in transaction queuing in the transaction processing server) and a load-balancing system (e.g. configure the NTM system with how load balancing is implemented in the NTM provider's infrastructure) may also be provided.

The system configuration unit may also be used to maintain or connect to a NTM provider's customer database of users of the NTM system. Such a database may be pre-existing or specially created in the NTM system. If specially created, the system configuration unit allows complete definition of the prioritization modes and levels and inclusion of any other necessary or optional information required for the effective performance of the NTM system. If the customer database is pre-existing, the system configuration unit can be used to identify the database and configure how the customer/user data is to be accessed and updated. The frequency of update between the customer database and the NTM server may also be defined including synchronization schemes. Furthermore, a scheme for determining the prioritization modes and levels applied to each customer/user may be defined. For example, demarcations (e.g. the balance of a customer/user's account, customer/user's transaction volume, "best customer" rating, inactivity, etc.) can be used to determine if the customer/user is entitled to, declined for or removed from prioritization. Optionally, if the customer/user is deleted from the database or put into "inactive" status, the associated coupon may be automatically deleted from the NTM server and/or user's device or else the prioritization mode/level may be put into a "best efforts" level of prioritization as defined. Additionally, a coupon template and/or database may be defined from the customer database by pre-defining coupon serial numbers to each customer.

Also, the system configuration unit can be used to create a specific transaction activity definition to provide a prioritization mode/level on demand. For example, a change in a user's prioritization level based on specific activities, values or events can include the following scenarios and are able to be configured into the NTM system. The first is if a user exceeds a specified level of activity or value e.g. in a brokerage scenario, a user's account with a NTM provider may exceed a specified value and the user then receives an increase in the level of prioritization. A second is when the user drops below a specified level of activity or value e.g. in the brokerage scenario, the user has not made any transactions over a certain period of time. Another scenario is when a specific transaction meets certain criteria and, for the duration of that session or following sessions, the level of prioritization is upgraded to a higher level e.g. in a brokerage scenario, the user places a buy order or a buy order exceeding a certain value. In a last scenario, a user ceases performing revenue-generating activities for a NTM provider e.g. in brokerage situation, the user switches from a buy/sell order to a quote request. As will be apparent to those skilled in the art, any innumerable amount of scenarios may be possible to involve increasing, reducing or eliminating prioritization.

In the specific transaction activity definition, for example, a URL and/or IP address or data element within a page at a URL or IP address may be used to identify a session or part of a session (e.g. a transaction) for prioritization. In the case of the data element, the definition would comprise information on how to identify and process the data element (e.g. apply prioritization if data element has certain value, identify by tag data, identify by metadata, etc.). The definition would also include information on the change or application of prioritization (e.g. if value exceeds a certain amount apply highest prioritization level). In an embodiment, all such transaction activity identification and processing is implemented in the NTM client (including various boolean rules pertaining to such transaction activity) and configurable through the system configuration unit. Additionally, extensible fields in one or more coupon(s) may be defined to provide transaction activity data on a user by user basis (e.g., one use may receive certain prioritization when a certain value is exceeded while another use may receive prioritization at different value).

The administration process and reporting unit implements recording usage of the NTM server and NTM prioritization in order to provide statistical data about the operation of the NTM server and system and to facilitate on-going maintenance, coupon management and license management. For example, it maintains data on available coupons, rate of coupon issuance, types of coupons issued and available, session information and any other custom data, all of which may be reported.

An administrative console of the NTM server provides a user interface to the various units of the NTM server. The administrative console may provide any or all of the following functions: defining extensible coupon fields, providing a template function to make changes to all coupons, adding or deleting coupons and/or coupon types, controlling NTM client information for installation, delivering and updating coupon policies, checking the available balance of coupons, manage dissolving coupons, managing licensing, coordinating multiple NTM servers, managing and maintaining the NTM system databases (e.g. coupon database(s), customer database(s), historical usage database(s)), managing and defining the reporting and tracking of NTM system operation (e.g. number of NTM clients issued, coupons issued, coupons available, rate of coupon issuance, rate of change of coupon issuance over time, number of each type of coupon issued, number of coupons presented for confirmation in the challenge/response), updating contact information and administrator passwords, etc.

Figure 7:
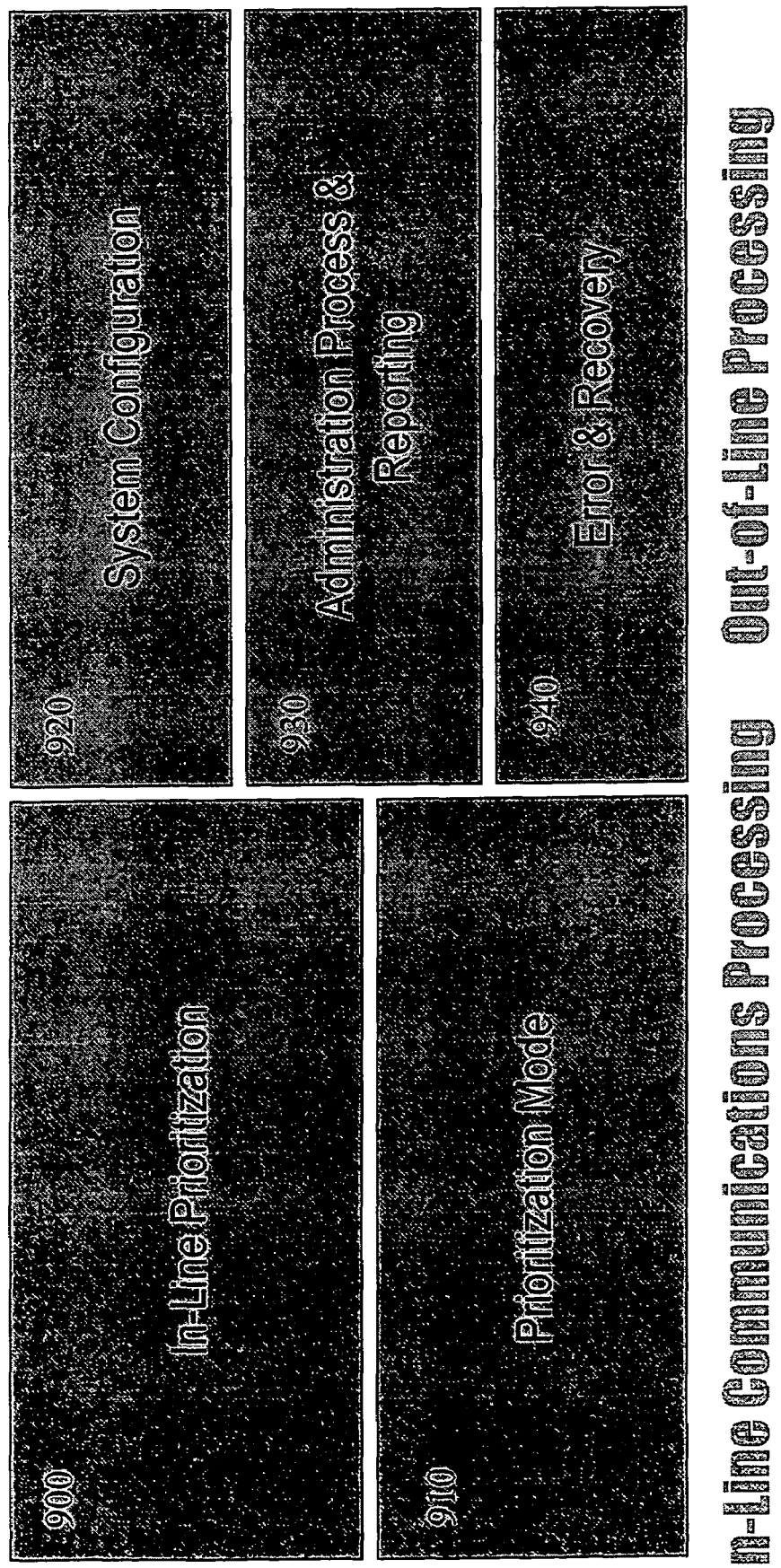
FIG. 7 is a NTM server block diagram showing the in-line and out-of-line communications of the NTM server according to a server embodiment of the invention.

FIG. 7 is a block diagram illustrating the basic architecture of a NTM server according to a server embodiment of the invention. Referring to FIG. 7, the in-line communications and out-of-line processing units of the NTM server are shown, The in-line processing units comprise an in-line prioritization unit 900 and a prioritization mode unit 910. The out-of-line processing units comprise a system configuration unit 830, an administration process and reporting unit 840 and an error and recovery unit 850.

The in-line communication processing units implement aspects of the NTM server actively involved in traffic processing for and initialization of NTM prioritization. The in-line prioritization unit implements the prioritization eligibility determination as well as the determination and management of any number of potential mode(s) and level (s), if any, of prioritization that may be applied to the network traffic. The information for prioritization eligibility determination, including mode(s) and levels), if any, of prioritization, is configured in the NTM server (as described in more detail hereafter) or optionally may be provided in a coupon whether located on the accessing user's device or maintained elsewhere or through an API.

The in-line prioritization unit may also keep track of the number of sessions on the NTM provider's infrastructure (e.g. Web or other server(s)) and adjust or limit active prioritization or best effort sessions based on, for example, classes of users, content values, transaction values or temporal values. For example, if the NTM provider's infrastructure is capable of handling 5,000 concurrent sessions at a reasonable level and that Gold prioritization level sessions take precedence over Silver prioritization level sessions, the NTM server may accept only Gold sessions at the expense of Silver sessions as the system limit is approached such that the Silver sessions are delayed. Or once the system limit is reached, Silver sessions may be dropped or delayed in favor of Gold sessions. And, once the number of Gold sessions decreases below a specified threshold, Silver sessions may be permitted to either continue or to begin. As should be apparent, any number of configurations is possible. Accordingly, the NTM provider's infrastructure can be focused exclusively on what the NTM provider deems important through the prioritization mode(s) and level(s), if any. Similar concepts may be applied to other techniques such as TCP rate control and windowing.

The prioritization mode unit implements applying the mode of prioritization to the traffic. For example, the prioritization mode unit implements the remapping of the TCP port and/or URL or IP address of network traffic for NTM prioritization and QoS information tagging into network traffic for NTM prioritization. Details of such remapping and tagging are described in more detail herein.

The system configuration unit of the NTM server is used to configure the operation of the NTM server. Typically, a NTM system administrator will securely sign on to the NTM server and configure the NTM system. For example, the QoS features available in the NTM provider infrastructure may be defined in the NTM system through the system configuration unit of the NTM server. Some of the QoS information that can be defined include the type of QoS protocol available (RSVP, DiffServ, MPLS, etc.), the QoS header string to be used for tagging, identification of whether a policy-based network management system is available and supported by the NTM server, and identification of a NTM system gateway in the local Internet service provider (ISP) or carrier network (and if so, the associated URL or IP address and QoS information).

The system configuration unit may also be used to define the prioritization eligibility information as well as the mode(s) and level(s), if any, of prioritization of the NTM system. Prioritization eligibility information such as user log-in information, session ID(s) types, or particular service requests (e.g. a buy transaction) may be configured into the NTM system. Further, the one or more TCP ports, URLs and/or IP addresses, if any, used in the NTM provider infrastructure for the prioritization mode; and the prioritization levels (e.g. Gold, Silver, Bronze, etc.), if any, associated therewith may be defined. For example, the top-level domain name(s), domain name mask(s), URL(s), URL mask(s), or IP address(es) of the NTM provider infrastructure may be defined. The default prioritization level for all incoming and/or outgoing NTM system traffic can also be defined.

The system configuration unit may also be used to define interoperation of the NTM server and NTM system with other hardware and software in the NTM provider's infrastructure as described above with respect to the client-server embodiment. The system configuration unit may also be used to maintain or connect to a NTM provider's customer database of users of the NTM system as described above with respect to the client-server embodiment. Although as described above, prioritization need not be solely defined for users in that prioritization mode(s) and level(s), if any, may be determined on any combination of criteria such as business value.

The administration process and reporting unit implements recording usage of the NTM server and NTM prioritization in order to provide statistical data about the operation of the NTM server and system and to facilitate on-going maintenance. For example, it maintains data on session information, prioritization mode(s) and level(s), if any, applied and any other custom data, all of which may be reported.

The error and recovery unit implements error logging and management of the NTM server. Its data can be used to generate reports of NTM system performance as well as to modify operation of the NTM system, as required, In a client-server embodiment, the NTM server is in an out-of-line configuration with the primary communications path such that another server refers work to the NTM server. According to this configuration, the NTM server does not add application logic but acts as a service enabling prioritization of traffic across the infrastructure. With the NTM server out-of-line, failure of the NTM server would not necessarily impact the continued operation of the infrastructure. Furthermore, the out-of-line configuration of the NTM server facilitates reduction of the processing of and load on the primary traffic. As will be apparent to those skilled in the art, the NTM server could also be in-line in the primary communications path, particularly in the server only embodiment. Moreover, the NTM server could be implemented as an embedded system such as in clustering or load-balancing switches and routers. To implement such of out-of-line operation, a server in the infrastructure would call the NTM server via an application programming interface (API) to initiate the appropriate server action. This action can include, as described herein, NTM client and coupon installation, processing of traffic information to determine prioritization and appropriate tagging and/or remapping of traffic. For example, in an out-of-line configuration, a Web server with which the user is communicating calls the NTM server via the API to install or otherwise make available the NTM client and/or coupon(s) to the user's device.

In an embodiment, the NTM server performs many critical pathing functions as well as NTM client distribution, coupon distribution, license updates, communications functions, etc. Accordingly robust operating systems such as UNIX and Linux are the primary environments for the server and the server would be implemented on a separate server machine. However, the server may equally be implemented on any other platform such as Microsoft Windows NT and Windows 2000. Server sizing is based on numerous factors including the final functional specifications, implementation and system requirements. Server code size and performance characteristics have a major impact on the server platform.

In an embodiment, the NTM server is a software program installable on computing devices using media such as CD-ROM or tape or via network download. On installation, a NTM provider may supply a key that is used to validate the installation and assists in determining the NTM server configuration, for example, including the number and/or types of coupons the NTM server is authorized to issue. The installation process may also take as input NTM provider information (such as NTM provider company name, address, contact name, etc.) and coupon serial number range data to validate the NTM provider and to configure the NTM system. Other servers in the NTM provider's infrastructure may be identified to the NTM system.

On installation, information regarding the coupons and/or the prioritization mode(s) and level(s), if any, may also be defined. In an embodiment, the NTM provider customer list may be configured or identified. The NTM provider customer list includes the users to which prioritization may be provided and it may be defined within the NTM system or "imported" into the NTM system. The customer list may be used to define the coupon database through explicit information associated with the customer list or through some criteria used to set/derive initial user prioritization modes and/or levels in the coupons. To facilitate the matching, the URL or IP addresses of the users may be identified.

Also, for the creation of coupons and/or the implementation of NTM prioritization, the remapped TCP ports, URLs and/or IP addresses may be defined along with associated prioritization levels, if any. Further, available infrastructure QoS may be identified, if any, such as RSVP, DiffServ, MPLS, etc. and associated QoS protocol parameters/tagging may defined as available (or an IP packet header string may be manually created for each identified QoS). A default (minimum) prioritization level may be defined for outgoing and incoming traffic and optionally, the incoming prioritization level may be reciprocated. Furthermore, whether a policy-based network management system or bandwidth management system is in use can be identified. If so, prioritization mode(s) and level(s), if any, may be updated as necessary for supported systems. Similarly, whether a transaction processing facility (TPF) is in use can be identified. If so, header strings or queue messages for each specified QoS can be defined including manual adjustments to TPF queue messages and manual configuration for non-supported TPF systems. Finally, with all the necessary prioritization information determined, the coupon database may be built.

As will be apparent to those skilled in the art, both the client-server and server only embodiment, in whole or in part, may be incorporated together. Further, the server only embodiment may employ or take the benefit of the coupon (s) of the client-server embodiment to determine, for example, the mode(s) and/or level(s), if any, of prioritization to be applied to network traffic.

Coupon

In an embodiment of the invention, the NTM coupon is a data structure comprising a number of key fields as outlined in Table 1. The coupon schema may be extended. Since it is impractical to determine what each NTM provider needs, desires or can offer in the way of network services prioritization, a coupon customization tool is provided as part of the coupon management functionality of the NTM server to allow for case-by-case custom development of coupon schema. While a certain number of fields will be common and must be present for the NTM system to work with more than one NTM provider, a number of additional coupon fields may be implemented and managed by a NTM provider. Accordingly, the coupon schema of Table 1 provides a number [1–n] of extensible fields that may be used for Internet service provider, backbone, and carrier prioritization schema as well as other application-specific or site-specific data fields including data such as form variables, XML or other markup language tags, account numbers, cookie data fields, etc.

TABLE 1

Coupon serial number
Company identifier (NTM provider issuing the coupon which may be part of the coupon serial number itself)
Coupon issue date/timestamp
Coupon dissolve date/timestamp (termination date or time of coupon)
Date/timestamp mask
Number of uses allowed
Use counter
Coupon last access date/timestamp (either session or coupon update)
Successful NTM client system session (True/False)
Default class of service (Platinum, Gold, Silver, Bronze, etc.)
MPLS (unique true/false)
DiffServ (unique true/false)
RSVP (unique true/false)
QoS header instruction
Top-level URL or IP address
URL or IP address [2-5]
Immediate URL or IP address redirection [1-5]
TCP Platinum [Gold, Silver, Bronze, etc.] port number
NTM server URL or IP address
Extensible fields [1-n]

For the NTM system to work with a number of different service providers and to handle possibly hundreds of active coupons on a NTM client, a set of unique information about each coupon and the various other coupon properties is provided. For example, a coupon serial number field can comprise long hexadecimal numbers or hexadecimal numbers in a series of octets equal to 512 bits e.g. AFF0.392B.0217.FFFD.EG84.0000.1234.CDAB. Using 512 bit hexadecimal numbers as serial numbers would provide enough unique identifiers for trillions of coupons and will likely avoid any need for repetition. Further, a large number of unique serial numbers will allow for the creation of coupon sub-types (such as promotional coupons) without significantly adversely affecting a NTM provider's ability to issue coupons.

In an embodiment, each NTM provider will be provided its own serial number range, and the coupon data will be encrypted or scrambled, so that only coupon data of coupons issued with serial numbers of the provider can be fully viewed and modified by that provider. As will be apparent to those skilled in the art, viewing and/or modification access to the coupons and coupon data may also be provided to others and the encryption and/or scrambling means may be any technique known in the art such as linear or variable bit-shifting. Indeed, my other known mean; may be used to keep the coupon data private, to prevent interference with the coupons and coupon data may be used and to confirm that the NTM system user(s) and provider are properly licensed.

The coupon schema may also comprise a company identifier field to identify the NTM provider issuing the coupon. Such identification may not be necessary if the NTM provider is apparent or may be determined from the coupon serial number. The coupon schema may also comprise a coupon issue date/timestamp which identifies the time and/or day of the issuance of the coupon. The coupon issue date/timestamp may be used in conjunction with the coupon dissolve date/timestamp described below to determine dissolution of the coupon.

The NTM system may allow a coupon to "dissolve" or self-terminate after a certain number of uses or a certain amount of time. Such a feature can be used by NTM providers to offer NTM prioritization as a promotion to retain existing or attract new users e.g. a try-and-buy situation. In an embodiment, the coupon dissolve date/timestamp and the number of use; allowed fields are used to implement respectively time based and use based dissolution of the coupon. A date/timestamp mask may also be provided. In application, for example, the coupon dissolve date/timestamp may define the day or time when the coupon will be dissolved or the coupon dissolve date/timestamp can be used in conjunction with the coupon issue date/timestamp to determine the expiry of a period of time upon which the coupon is dissolved. The use counter field is used to track the number of uses of the coupon for, among other things, determining the dissolution of the coupon.

The coupon schema may also comprise a coupon last access date/timestamp identifying the last date or time when the coupon was accessed. That field could he used in conjunction with the dissolution feature. The field along with the coupon issue date/timestamp could also be for determining an update of the coupon. The coupon last access date/timestamp can be altered during a session and/or when the coupon is updated. For example, at the beginning of every session, the NTM client will put a date/timestamp into the coupon last access date/timestamp field of the coupon(s) used in the session. Also, when a NTM client recognized a specific URL or IP address based on matching coupon data, the NTM client sends a verification message to the NTM server for validation. At that validation step, the NTM server may update the coupon and the coupon last access date/timestamp field.

A successful NTM client system session may also be provided in the coupon schema. It can have a true or false value and is used for error reporting and recovery as well as for performance evaluation of the NTM system. A default class of service field may also be provided which defines the default prioritization level provided in the absence of any other definition of prioritization level if a mode of prioritization is in effect.

Fields also may be provided for containing QoS information used in the QoS tagging aspect of the NTM system described above. In particular, MPLS, DiffServ and RSVP fields may be provided having either a unique true or false value to indicate whether the respective QoS is available in the infrastructure. The QoS header instruction field comprises the QoS information tagged into the messages and/or packets if QoS is available as specified by the MPLS, Diffserv and RSVP fields.

The top-level URL or IP address, URL or IP address [2–5] and the immediate URL or IP address redirection [1–5] key fields as shown in the coupon field structure above may be used to facilitate remapping traffic to an alternative URL or IP address specified in the immediate URL (or IP address) redirection field as described in more detail above. In an embodiment, when the NTM client matches the URL or IP address of the traffic against the URL or IP address(es) specified in the top-level URL (IP address) or URL and/or IP address fields in the coupon data and finds a match, it first reads other instructions in the coupon data to determine the prioritization mode to applied such as TCP port remapping and QoS tagging and any associated prioritization level, if applicable. If there are no such instructions, the traffic is remapped to a corresponding URL or IP address specified in the URL (or IP address) redirection field, each URL or IP address in the redirection field may correspond to a different prioritization level. Any number of URLs and/or IP addresses (and matching remapped URLs and/or IP addresses for prioritization) may be tracked.

One or more TCP port number fields may be provided in the coupon schema to define remapped TCP ports according to prioritization level available for the TCP port remapping prioritization mode. For example, a Platinum port number field may comprise the remapped port for Platinum service in the NTM system. Simarly, a Gold port number field may comprise the remapped for Gold service. As will be apparent to those skilled in the art, other prioritization naming and levels may be used than as illustrated here, The coupon schema may also provide a NTM server URL or IP address field that comprises the URL or IP address of the NTM server associated with the coupon. This field can be used for reference purposes or for a NTM client to identify the NTM server associated with a coupon.

The coupons used in the NTM system are preferably compact so that, for example, the NTM system may be implemented in small-resource systems as such as personal digital assistants (PDAs) or wireless Internet terminals such as cellular phones or pagers. Also for the purposes of, among other things, control, economy and security, the coupons in an embodiment of the invention are themselves not individual, discrete files such as cookies but elements of an internal NTM client coupon database stored with the NTM client in a hidden, system and read-only directory. Moreover, the coupon database is replicated preferably in at least two other locations in the user's device (except on such small resource devices as previously described) for reliability and fault tolerance purposes and is secured through the use of scrambling and/or encryption of the coupons. As will apparent to those skilled in the art, the storage of coupons could be implemented any number of other ways including as individual files such as cookies.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the present invention is not limiting of the present invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the present invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the present invention described herein; the operations are machine operations. Useful machines for performing the operations of the present invention include general purpose digital computers, special purpose computers or similar devices.

Each operation of the method may be executed on any general computer, such as a mainframe computer, personal computer or the like and pursuant to one or more, or a part of one or more, program modules or objects generated from any programming language, such as C++, Java, Fortran, etc. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a microprocessor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations described herein without departing from the spirit of the invention. For instance, in certain cases, the operations may be performed in differing order, or operations may be added, deleted or modified. An embodiment Of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device or computer program product may include, but is not limited to, CD-ROM, CD-R, CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to the method of the invention and/or to structure its components in accordance with a system of the invention.

An embodiment of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuits The invention presented herein is not inherently related to a particular computer system or other apparatus. The required structure for a variety of these systems will appear from the description given.

While this invention has been described in relation to certain embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention. Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense, As such, the present invention is not intended to be limited to the embodiments shown above but rather is to be accorded the widest scope consistent with the principles and novel features disclosed in any fashion herein.

What is claimed:

1. A method of prioritizing network communications, comprising:
   providing a plurality of TCP ports with each TCP port receiving network communications of a different level of priority;
   providing an electronic coupon indicating a level of priority of a network communication;
   determining at a server based upon data, received from a client or user, from the electronic coupon the level of priority of the network communication; and
   directing the network communication from the client or user to one of the plurality of TCP ports receiving communications of the determined level of priority until the level of priority is terminated or modified.

2. The method of claim 1, further comprising determining if the network communication should be provided prioritization based upon a URL or IP address associated with the network communication.

3. The method of claim 2, wherein if it is determined that the network communication should not be provided prioritization, handling the network communication in a normal manner without prioritization.

4. The method of claim 1, further comprising:
   determining from the electronic coupon quality of service (QoS) information; and
   applying the QoS information to the network communication.

5. The method of claim 1 wherein the network communications are Internet Protocol communications.

6. The method of claim 1 wherein the level of priority of a network communication is defined in relation to any one of customer value, content value, transaction value, or temporal value.

7. A method for prioritizing network services, the network services including communications traffic, the method comprising:
  determining at a server based upon data, received from a client or user, in a coupon associated with the client or user, the coupon defining a mode of prioritization, that the communications traffic should receive prioritization; and
  applying the mode of prioritization defined by the coupon to all subsequent communications traffic from the client or user until the mode of prioritization is terminated or modified.

8. The method of claim 7 wherein the coupon further defines a level of prioritization and applying the mode of prioritization further comprises applying the level of prioritization defined by the coupon to the communications traffic.

9. The method of claim 8 wherein the level of prioritization is defined in relation to any one of customer value, content value, transaction value, or temporal value.

10. The method of claim 7 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

11. The method of claim 7 wherein the network services are Internet services and the communications traffic is Internet communications traffic.

12. The method of claim 7, wherein determining that the communications traffic should receive prioritization comprises determining that the communications traffic should receive prioritization based upon a URL or IP address associated with the communications traffic.

13. The method of claim 7, further comprising:
  determining that the communications traffic should not receive prioritization; and
  handling the communications traffic in a normal manner without prioritization.

14. The method of claim 7, further comprising providing a client to a user of the network services to perform the determining that the communications traffic should receive prioritization and applying the mode of prioritization defined by the coupon to the communications traffic.

15. A method for prioritizing network services, the network services including communications traffic, the method comprising:
  determining at a server based upon data, received from a client or user, in a coupon associated with the client or user that the communications traffic from the client or user should receive a mode of prioritization; and
  applying the mode of prioritization to all subsequent communications traffic from the client or user until the mode of prioritization is terminated or modified.

16. The method of claim 15 further comprising determining that the communications traffic should receive a level of prioritization and applying the mode of prioritization further comprises applying the level of prioritization to the communications traffic.

17. The method of claim 16 wherein the level of prioritization is defined in relation to any one of customer value, content value, transaction value, or temporal value.

18. The method of claim 15 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

19. The method of claim 15 wherein the network services are Internet services and the communications traffic is Internet communications traffic.

20. The method of claim 15, wherein determining that the communications traffic should receive prioritization comprises determining that the communications traffic should receive prioritization based on log-in information of a user associated with the communications traffic.

21. The method of claim 15, further comprising:
  determining that the communications traffic should not receive prioritization; and
  handling the communications traffic in a normal manner without prioritization.

22. A server for prioritizing communications traffic, comprising:
  an in-line prioritization unit to determine based upon data, received from a client or user, in a coupon associated with the client or user that the communications traffic from the client or user should receive a mode of prioritization; and
  a prioritization mode unit to apply the mode of prioritization to all subsequent communications traffic from the client or user until the mode of prioritization is terminated or modified.

23. The server of claim 22, wherein the in-line prioritization unit is configured to determine that the communications traffic should receive a level of prioritization and the prioritization mode unit further is configured to apply the level of prioritization to the communications traffic.

24. The server of claim 23 wherein the level of prioritization is defined in relation to any one of customer value, content value, transaction value, or temporal value.

25. The server of claim 22, wherein the mode of prioritization includes any one of remapping a TCP port associated with the communications traffic to another TCP port, remapping a URL or IP address associated with the communications traffic to another URL or IP address, or tagging quality of service (QoS) information into the communications traffic.

26. The server of claim 22 wherein the communications traffic is Internet communications traffic.

27. The server of claim 22, wherein the in-line prioritization unit is configured to determine that communications traffic should receive a mode of prioritization based on log-in information of a user associated with the communications traffic.

28. A system for prioritizing network services, the network services including communications traffic, the system comprising:
  means for determining at a server based upon data, received from a client or user, in a coupon associated with the client or user, the coupon defining a mode of prioritization, that the communications traffic should receive prioritization; and
  means for applying the mode of prioritization defined by the coupon to all subsequent communications traffic from the client or user until the mode of prioritization is terminated or modified.

29. The system of claim 28 wherein the coupon further defines a level of prioritization and the means for applying the mode of prioritization further comprises means for applying the level of prioritization defined by the coupon to the communications traffic.

30. The system of claim 29 wherein the level of prioritization is defined in relation to any one of customer value, content value, transaction value, or temporal value.

31. The system of claim 28 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

32. The system of claim 28 wherein the network services are Internet services and the communications traffic is Internet communications traffic.

33. The system of claim 28, wherein the means for determining that the communications traffic should receive prioritization comprises means for determining that the communications traffic should receive prioritization based upon a URL or IP address associated with the communications traffic.

34. A system for prioritizing network services, the network services including communications traffic, the system comprising:
means for determining at a server based upon data, received from a client or user, in a coupon associated with the client or user that the communications traffic from the client or user should receive a mode of prioritization; and
means for applying the mode of prioritization to all subsequent communications traffic from the client or user until the mode of prioritization is terminated or modified.

35. The system of claim 34 further comprising means for determining that the communications traffic should receive a level of prioritization and the means for applying the mode of prioritization further comprises means for applying the level of prioritization to the communications traffic.

36. The system of claim 35 wherein the level of prioritization is defined in relation to any one of customer value, content value, transaction value, or temporal value.

37. The system of claim 34 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

38. The system of claim 34 wherein the network services are Internet services and the communications traffic is Internet communications traffic.

39. The system of claim 34, wherein the means for determining that the communications traffic should receive prioritization comprises means for determining that the communications traffic should receive prioritization based on log-in information of a user associated with the communications traffic.

40. The system of claim 34, further comprising:
means for determining that the communications traffic should not receive prioritization; and
means for handling the communications traffic in a normal manner without prioritization.

41. A computer program product including computer program code to cause a computer to perform a method for prioritizing network services, the network services including communications traffic, the method comprising:
determining at a server based upon data, received from a client or user, in a coupon associated with the client or user, the coupon defining a mode of prioritization, that the communications traffic should receive prioritization; and
applying the mode of prioritization defined by the coupon to all subsequent communications traffic from the client or user until the mode of prioritization is terminated or modified.

42. The computer program product of claim 41 wherein the coupon further defines a level of prioritization and applying the mode of prioritization further comprises applying the level of prioritization defined by the coupon to the communications traffic.

43. The computer program product of claim 42 wherein the level of prioritization is defined in relation to any one of customer value, content value, transaction value, or temporal value.

44. The computer program product of claim 41 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

45. The computer program product of claim 41 wherein the network services are Internet services and the communications traffic is Internet communications traffic.

46. The computer program product of claim 41, wherein determining that the communications traffic should receive prioritization comprises determining that the communications traffic should receive prioritization based upon a URL or IP address associated with the communications traffic.

47. The computer program product of claim 41, the method further comprising:
determining that the communications traffic should not receive prioritization; and
handling the communications traffic in a normal manner without prioritization.

48. The computer program product of claim 41, the method further comprising providing a client to a user of the network services to perform the determining that the communications traffic should receive prioritization and applying the mode of prioritization defined by the coupon to the communications traffic.

49. A computer program product including computer program code to cause a computer to perform a method of prioritizing network communications, the method comprising:
providing a plurality of TCP ports with each TCP port receiving network communications of a different level of priority;
providing an electronic coupon indicating a level of priority of a network communication;
determining at a server based upon data, received from a client or user, from the electronic coupon the level of priority of the network communication; and
directing the network communication from the client or user to one of the plurality of TCP ports receiving communications of the determined level of priority until the level of priority is terminated or modified.

50. The computer program product of claim 49, the method further comprising determining if the network communication should be provided prioritization based upon a URL or IP address associated with the network communication.

51. The computer program product of claim 50 wherein the level of priority is defined in relation to any one of customer value, content value, transaction value, or temporal value.

52. The computer program product of claim 49, wherein if it is determined that the network communication should not be provided prioritization, handling the network communication in a normal manner without prioritization.

53. The computer program product of claim 49, further comprising:
   determining from the electronic coupon quality of service (QoS) information; and
   applying the QoS information to the network communication.

54. The computer program product of claim 49 wherein the network communications are Internet communications.

55. A computer program product including computer program code to cause a computer to perform a method for prioritizing network services, the network services including communications traffic, the method comprising:
   determining at a server based upon data, received from a client or user, in a coupon associated with the client or user that the communications traffic from the client or user should receive a mode of prioritization; and
   applying the mode of prioritization to all subsequent communications traffic from the client or user until the mode of prioritization is terminated or modified.

56. The computer program product of claim 55, the method further comprising determining that the communications traffic should receive a level of prioritization and applying the mode of prioritization further comprises applying the level of prioritization to the communications traffic.

57. The computer program product of claim 56 wherein the level of prioritization is defined in relation to any one of customer value, content value, transaction value, or temporal value.

58. The computer program product of claim 57 wherein the mode of prioritization comprises any one of remapping a TCP port associated with the communications traffic to another TCP port, remapping a URL or IP address associated with the communications traffic to another URL or IP address, or tagging quality of service (QoS) information into the communications traffic.

59. The computer program product of claim 57 wherein the network services are Internet services and the communications traffic is Internet communications traffic.

60. The computer program product of claim 57, wherein determining that the communications traffic should receive prioritization comprises determining that the communications traffic should receive prioritization based on log-in information of a user associated with the communications traffic.

61. The computer program product of claim 57, the method further comprising:
   determining that the communications traffic should not receive prioritization; and
   handling the communications traffic in a normal manner without prioritization.

* * * * *